(12) United States Patent
Wasserman (10) Patent No.: US 7,092,860 B1
(45) Date of Patent: Aug. 15, 2006

(54) HARDWARE SIMULATION SYSTEMS AND METHODS FOR VISION INSPECTION SYSTEMS

(75) Inventor: Richard M. Wasserman, Redmond, WA (US)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 09/243,689

(22) Filed: Feb. 3, 1999

(51) Int. Cl.
*G06G 7/48* (2006.01)
*G01B 11/00* (2006.01)

(52) U.S. Cl. ............ 703/5; 703/6; 703/7; 700/83; 700/59; 700/259; 434/44; 356/396

(58) Field of Classification Search ............ 703/6, 703/7, 5; 434/44; 700/259, 59, 83; 356/4.04, 356/4, 396
See application file for complete search history.

(56) References Cited

U.S. PATENT DOCUMENTS

| | | | |
|---|---|---|---|
| 4,471,448 A * | 9/1984 | Williams ............ 356/139.04 |
| 4,639,588 A * | 1/1987 | Shinoda ............ 250/201.2 |
| 5,137,450 A * | 8/1992 | Thomas ............ 434/44 |
| 5,220,398 A * | 6/1993 | Horn et al. ............ 356/141.5 |
| 5,481,712 A * | 1/1996 | Silver et al. ............ 717/109 |
| 5,897,611 A * | 4/1999 | Case et al. ............ 702/150 |
| 5,940,296 A * | 8/1999 | Meyer ............ 700/83 |
| 5,988,862 A * | 11/1999 | Kacyra et al. ............ 703/6 |
| 6,064,759 A * | 5/2000 | Buckley et al. ............ 382/154 |
| 6,084,590 A | 7/2000 | Robotham et al. |
| 6,124,864 A | 9/2000 | Madden et al. |
| 6,137,303 A * | 10/2000 | Deckert et al. ............ 324/765 |
| 6,160,907 A | 12/2000 | Robotham et al. |
| 6,173,070 B1 * | 1/2001 | Michael et al. ............ 382/145 |
| 6,196,845 B1 * | 3/2001 | Streid ............ 434/44 |
| 6,246,468 B1 * | 6/2001 | Dimsdale ............ 356/4.02 |
| 6,298,284 B1 * | 10/2001 | Burns et al. ............ 700/279 |
| 6,301,763 B1 * | 10/2001 | Pryor ............ 29/407.04 |
| 6,473,079 B1 * | 10/2002 | Kacyra et al. ............ 345/419 |
| 6,577,757 B1 * | 6/2003 | DeYong et al. ............ 382/149 |
| 6,614,925 B1 * | 9/2003 | DeYong et al. ............ 382/149 |

OTHER PUBLICATIONS www.opengl.org homepage print out, Nov. 25, 2002, OpenGL Reference Manual, OpenGL ARchitachture Review Board, Addison-Wesley Developers Press, Reading, MA, 1996.*
"Robotics" (Understanding Computers series) by Time-Life Books, 1986, ISBN 0-8094-5969-6, pp. 41, 42, 54-55, and 116-117.*
"Robotics" (Understanding Computers series) by Time-Life Books, 1986, ISBN 0-8094-5969-6, pp. 19-25.*
Bruce G. Batchelor, Frederick M. Waltz, "Machine Vision Systems Integration in Industry" SPIE Proceedings Nov. 8-9, 1990, pp. 158-162.*
Yongmin Kim, "Medical Imaging IV: Image Capture and Display" SPIE Proceedings Feb. 4-5, 1990, pp. 380-389.*
"A Realistic Camera Model for Computer Graphics," by Craig Kolb et al., Computer Graphics Proceedings, Annual Conference Series, Jun. 8, 1995, pp. 317-324.

(Continued)

*Primary Examiner*—Paul L. Rodriguez
*Assistant Examiner*—Dwin M. Craig
(74) *Attorney, Agent, or Firm*—Oliff & Berridge PLC (57) ABSTRACT

The systems and methods of this invention provide simulated images to vision inspection systems. The simulated images emulate the vision of a vision inspection system. Graphical models of objects in a virtual world and lens effects models are used to provide the simulated images.

29 Claims, 5 Drawing Sheets

OTHER PUBLICATIONS

"A Lens and Aperture Camera Model for Synthetic Image Generation," by Michael Potmesil et al., Computer Graphics, vol. 15, No. 3, Aug. 1981, pp. 297-305.

"Modeling Optical Vision Systems with Innovative Software", by Michael Stevenson et al., Visual Systems Design, vol. 4, No. 1, Jan. 1999, pp. 29, 30, 32-35.

* cited by examiner

HARDWARE SIMULATION SYSTEMS AND METHODS FOR VISION INSPECTION SYSTEMS

BACKGROUND OF THE INVENTION

1. Field of Invention

This invention is directed to methods and systems that simulate images produced by a vision system. More particularly, this invention is directed to methods and systems that generate a synthetic image that accurately approximates an image produced by an automated vision inspection system.

2. Description of Related Art

A wide variety of non-contact computer-vision-based systems exist that recognize or measure key features of parts or materials in a manufacturing environment. Many of these systems have a "training" or "programming" mode. In the programming mode, the system receives instructions regarding how to recognize or measure a part. This programming mode results in a set of instructions that are automatically repeated by the system. These instructions may be organized as a program in a general purpose scripting language or as a macro sequence. Stored program instruction sequences in either scripting or macro languages are known as part programs. The sequence of learning or training a part program is known as part programming.

SUMMARY OF THE INVENTION

Off-line programming software tools are popular for traditional, non-image-based coordinate measuring machines and robots. Off-line programming tools assist a programmer in selecting machine instructions to include in a program for the non-image-based coordinate measuring machines and robots. However, these off-line programming software tools do not account for problems experienced when forming optical images through physical lens systems because such concerns are not present in traditional, non-image-based coordinate measurement machines or robots. Therefore, these known off-line programming software tools are inadequate for any machine that includes a machine vision system and totally unsuitable for modern image-based inspection and/or motion systems.

The systems and methods of the invention use 3D graphical models of workpieces to simulate the images produced by the physical hardware of a vision inspection system. An exemplary embodiment of the system and method of this invention provides these synthetic images at a speed which approximates the real-time generation of images in a real vision inspection system. The simulation systems and methods of this invention produce synthetic video images that are comparable to the images that are captured by a camera looking through a lens at a workpiece in a vision inspection system.

The simulation systems and methods of this invention may be integrated with a user interface from machines which include a machine vision system, and especially with a user interface from a vision inspection system, to provide an off-line programming environment. The term "off-line programming" describes the creation of a part program without interfering with the ongoing operation of a physical vision inspection system.

The methods and systems of the invention separately provide vision simulation systems that allow vision system designers to develop software-only versions of vision inspection systems. Such software-only implementations will present the same user interface to operators as would be presented by a corresponding physical vision inspection station. Hardware emulation modules in the systems and methods of this invention simulate physical components of the visual inspection stations, such as cameras, lighting, lenses and motion control platforms. The simulation systems and methods of this invention generate synthetic images based on state models of the vision systems and computer-aided-design models of workpieces to be measured. The computer-aided-design models of workpieces may be provided by conventional commercial CAD packages, such as pro/ENGINEER from Parametric Technology Corporation, Waltham, Mass. 02453, and may coincide with the CAD data files which govern manufacturing of actual workpieces which would eventually be placed under the actual vision inspection station.

The synthetic images generated by the systems and methods of this invention may be used in place of the video captured by a camera in a hardware-based vision system. The systems and methods of this invention allow designers to readily develop an off-line version of an inspection system by replacing hardware-based software subsystems with subsystems that communicate with virtual components of a vision simulation engine. Operators are able to modify parameters in the virtual inspection system and immediately see the results as a change in the synthesized image. Because the inspection system simulation systems and methods of this invention are usable with existing vision inspection system user interfaces, a user may gain familiarity with the user interface prior to interacting with an actual physical vision inspection system.

The inspection system simulation systems and methods of this invention reduce system downtime due to creating new inspection part programs. The systems and methods of this invention are also able to improve operator training and to provide improved tools for off-site sales and marketing of vision inspection systems.

These and other features and advantages of this invention are described in or are apparent from the following detailed description of the exemplary embodiments.

BRIEF DESCRIPTION OF THE DRAWINGS

The preferred embodiments of this invention will be described in detail, with reference to the following figures, wherein.

DETAILED DESCRIPTION OF PREFERRED EMBODIMENTS

Figure 1:
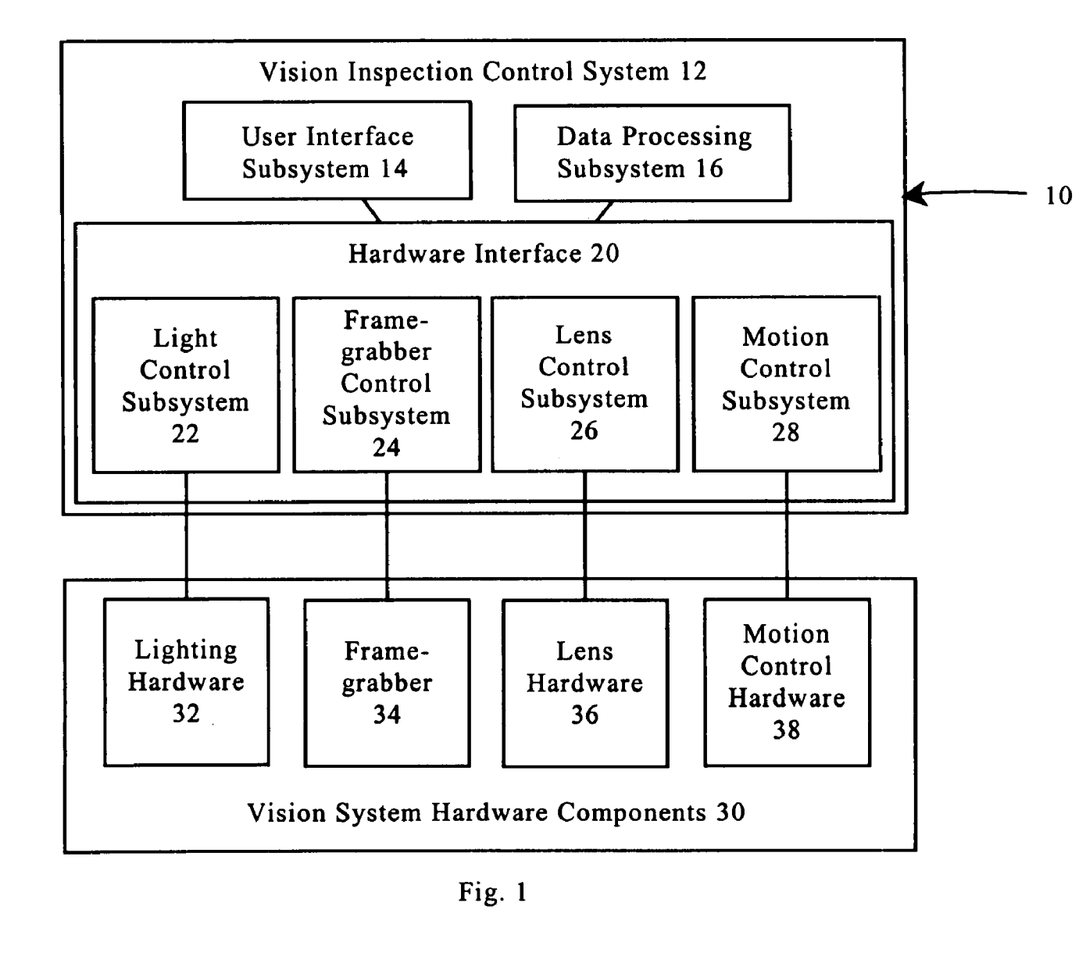
FIG. 1 is a block diagram of one exemplary embodiment of a hardware-based vision inspection system.

FIG. 1 is a block diagram of one exemplary embodiment of a physical vision inspection system 10. The vision inspection system 10 includes a vision inspection control system 12. The vision inspection control system 12 includes a user interface subsystem 14, a data processing subsystem 16 and a hardware interface 20. The hardware interface 20 includes a light control subsystem 22, a framegrabber subsystem 24, a lens control subsystem 26 and a motion control subsystem 28. The hardware interface 20 communicates with the vision system hardware components 30. In particular, the vision system hardware components 30 includes lighting hardware 32, framegrabber 34, lens hardware 36 and motion control hardware 38. The framegrabber 34 may include an internal or external framegrabber mechanism to produce still or real-time digital representations of a scene viewed by a monochrome or color camera. The camera and the framegrabber 34 combination described herein is intended to include both analog and digital camera configurations. For example, a digital camera may include an integral framegrabber.

Each of the physical hardware systems 32–38 of the vision system hardware components 30 represent one or more physical components of a typical machine vision inspection system. The systems and methods of this invention use graphical and physical modeling techniques to replace all of these components with a virtual model of the vision system hardware components 30.

One example of a commercially available vision inspection system which corresponds to the vision inspection system of FIG. 1, is the Quick Vision series of vision inspection machines available from Mitutoyo MTI Corporation Aurora, Ill. One example of a commercially available vision inspection control system including a user interface subsystem which corresponds to vision inspection control system 12 and user interface subsystem 14 of FIG. 1, is the QVPak operating software for the Quick Vision series of vision inspection machines available from Mitutoyo MTI Corporation Aurora, Ill.

Figure 2:
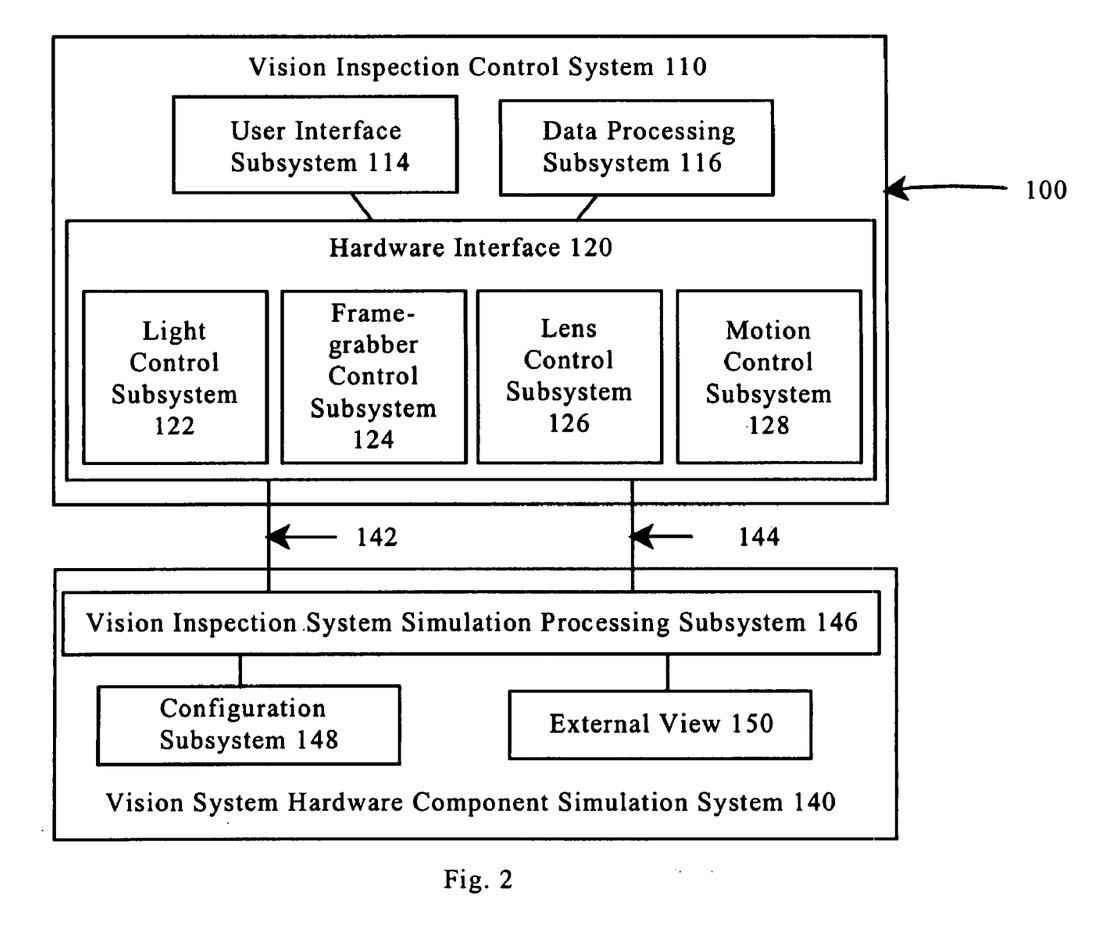
FIG. 2 is a block diagram of the exemplary embodiment of the vision inspection system using one exemplary embodiment of an inspection system simulation system in accordance with this invention.

FIG. 2 shows one exemplary embodiment of a vision simulation system 100 according to this invention, comprising a vision inspection control system 110 and one exemplary embodiment of a vision system hardware components simulation system 140 according to this invention. The vision inspection control system 110 is identical to the vision inspection control system 12 of FIG. 1 and includes a user interface subsystem 114, a data processing subsystem 116 and a hardware interface 120. The hardware interface 120 includes a light control subsystem 122, a framegrabber subsystem 124, a lens control subsystem 126 and a motion control subsystem 128.

The vision system hardware components simulation system 140 is preferably implemented on a programmed general purpose computer. However, the vision system hardware components simulation system 140 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIGS. 4A and 4B, can be used to implement the vision system hardware components simulation system 140.

The hardware interface 120 communicates with the vision system hardware components simulation system 140 over links 142 and 144. The vision system hardware components simulation system 140 includes a vision inspection system simulation processing subsystem 146 which communicates with a configuration subsystem 148, and an external view 150.

It should be appreciated that, if the vision system hardware components simulation system 140 is implemented in hardware or remotely from the vision inspection control system 110, the links 142 and 144 can be any now known or later developed device or system for connecting the vision inspection control system 110 to the vision system hardware components simulation system 140, including a direct cable connection, a connection over a wide area network or a local area network, a connection over an intranet, a connection over the Internet, or a connection over any other distributed processing network or system. In general, the links 142 and 144 can be any known or later developed connection system or structure usable to connect the vision inspection control system 110 to the vision system hardware components simulation system 140.

If the vision system hardware components simulation system 140 is implemented locally to the vision inspection control system 110, such as by a software application program, the links 142 and 144 are software structures that route data and control signals between the vision inspection control system 110 and the vision system hardware components simulation system 140. The vision system hardware components simulation system 140 receives control data over the link 142 from the vision inspection system simulation system 110 and sends synthetic image data over the link 144 to the vision inspection control system 110.

The configuration subsystem 148 stores models of a virtual world and includes a systems lighting model, a motion control model, a workpiece model, and lens and camera configuration data that are used by the processing subsystem 146 to produce still and/or real-time synthetic images.

As shown in FIG. 2, the vision system hardware components simulation system 140 is integrated with the vision inspection control system 110, which is intended to drive the physical vision system hardware components 30. The vision system hardware components simulation system 140 is a hardware- or software-based emulation system that replaces the physical cameras, lenses, lights, stages, etc. of the physical vision system hardware components 30 shown in FIG. 1.

The vision system hardware components simulation system 140 is capable of producing images of a simulated vision inspection target at differing heights relative to a virtual optical system and camera. These synthetic images, which may include out-of-focus images and lighting effects, facilitate rapid and intuitive off-line programming.

The vision system hardware components simulation system 140 can also produce a three-dimensional external view 150 of the entire simulated vision inspection system. The external view approximates what is seen by the user when physically viewing a physical vision inspection system. Such an external view provides many important spatial cues to a system operator to further facilitate rapid and intuitive off-line programming.

A user of the systems and methods of this invention can import and fix computer-aided design (CAD) models of workpieces onto a virtual stage of the vision system hardware components simulation system 140 by importing and storing CAD models in the configuration subsystem 148. Real-time, synthetic digital images of the stage and the workpiece are then created and provided to the vision inspection control system 110 by the vision system hardware components simulation system 140. Users may then inspect the simulated workpieces on the virtual vision inspection machine simulated by the vision system hardware components simulation system 140 to select instructions for part programs that will run on the physical vision inspection system that is being simulated by the vision system hardware components simulation system 140.

The processing subsystem 146 creates synthetic images by taking at least one of the following factors into account: camera position and view; light source positioning; orientation of the workpiece relative to the stage; current position and orientation of the stage relative to the camera; lens subsystem parameters, such as focal length; the geometry of the modeled lens system; the optical effects produced by the lens and lighting systems; the optical properties of the workpiece; and the physical properties of the workpiece.

Figure 3:
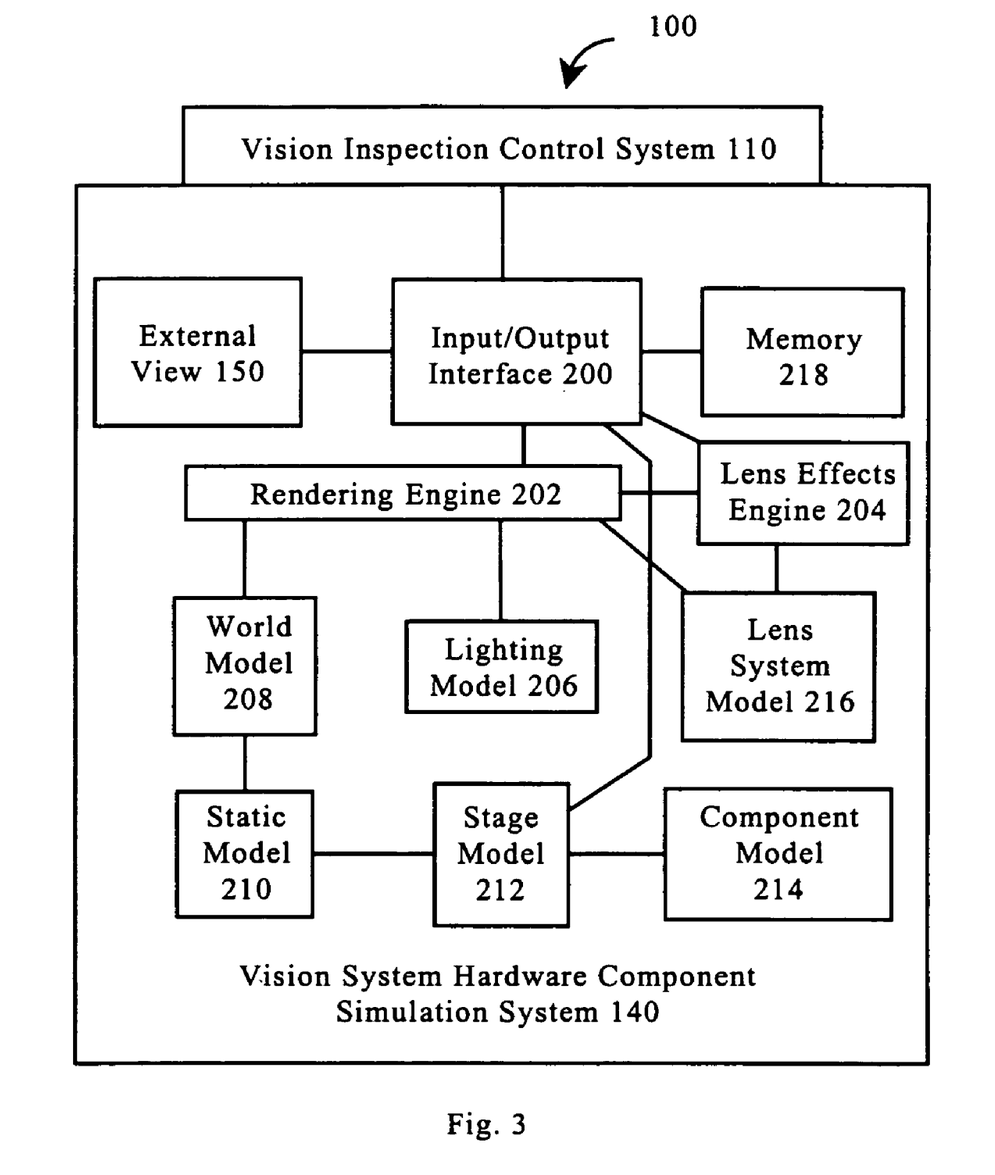
FIG. 3 is a block diagram showing in greater detail one exemplary embodiment of a vision simulation engine in accordance with this invention.

FIG. 3 shows another exemplary embodiment of the vision system hardware components simulation system 140 of the vision simulation system 100 in accordance with the invention. As shown in FIG. 3, in this exemplary embodiment, the vision system hardware components simulation system 140 includes an input/output interface 200 and a rendering engine 202. The interface 200 includes subsystems that store the position of the virtual stage, the parameters for the virtual lens system and the parameters for the lighting system. The parameters of the virtual lighting system include the magnitude, the color, the orientation and the type of each virtual light source in the system. The parameters of the virtual lens system include magnification, field of view, focal length and depth of field of the simulated lens system.

The vision system hardware components simulation system 140 also includes a lighting model 206 which models light emanating from each virtual lighting source. The lighting model 206 describes the light from each virtual lighting source and includes information regarding position, orientation, magnitude, color and type of light from each light source.

The vision system hardware components simulation system 140 also includes a virtual world model 208, a static environment model 210, a virtual stage model 212 and a component model 214. The models 208–214 record and update the geometrical and physical model descriptions of a virtual stage and virtual workpieces. Each component is described in the corresponding model 208–218 in a scene hierarchy consistent with current graphical surface modeling techniques. Each model is a set of polygons connected at a collection of common nodes. Each node contains information such as position, color, material information, and texture coordinates. Each object may include one or more texture maps to be applied to the surface faces.

The virtual world model 208 stores a complete current 3D model of the virtual stage table, the virtual movable stage components and all of the virtual workpieces on the virtual stage. This virtual world model 208 is constructed from a hierarchy of components that include the static environment model 210, the virtual stage model 212 and the component model 214, including the position and orientation of the workpiece on the stage. When the virtual stage moves relative to the virtual stage table, the workpieces on the stage translate in a global coordinate system accordingly.

The vision system hardware components simulation system 140 also includes a lens system model 216 which stores virtual lens system data, such as field of view and perspective. The lens system model 216 transmits lens system data to the rendering engine 202.

The foregoing description assumes a typical case for many machine vision systems, where the camera is fixed in a global coordinate system, and the workpieces are moved relative to the camera by means of a moving stage component, for example an X-Y table, a conveyor belt, or the like.

In other cases, where the camera and optical system are mounted in a gantry configuration, or on the end of a robotic arm, the camera and optical system move relative to the global coordinate system, and the workpiece remains fixed relative to the global coordinate system. In the later case, the lighting model 206 should include the lighting position and orientation relative to the workpiece and the lens system, and the lens system model 216 should include the lens system position and orientation relative to the workpiece(s), stage, static model and world model. In the later case, the stage model 212 has no moving features, and may be included in the static model. In any case, the crucial data for image simulation is the relative position and orientation of the optical system, the workpiece(s) and the lighting system, and one skilled in the art can allocate relative position data for these elements to the appropriate models according to any of the well-established methods for relating objects in a set of local and global coordinate systems.

The vision system hardware components simulation system 140 also includes a memory 218 which stores the two-dimensional image.

The vision system hardware components simulation system 140 also includes a rendering engine 202. Examples of such a rendering engine is OpenGL or Direct3D. OpenGL is an open standard for 3D graphical rendering which is described in *OpenGL Reference Manual*, OpenGL Architecture Review Board, Addison-Wesley Developers Press, Reading, Mass., 1996. Direct3D is a component of the DirectX system of tools distributed by Microsoft Corporation in conjunction with their Windows™ operating system. The rendering engine 202 accepts as input the 3D polygonal model stored in the virtual world model 208, the lens model 216 and the lighting model 206. The rendering engine 202 may be any system which produces a two-dimensional image and a depth map given a three-dimensional model, using Gouraud shading, raytracing, etc. The rendering engine 202 receives the 3D polygonal model and lighting data from the lighting model 206 and the virtual world model 208, respectively.

The rendering engine 202 creates two-dimensional image data as viewed through an ideal pinhole lens system. The 2D image data includes a two-dimensional mapping which stores the distance of each pixel in the image map from the virtual camera. The rendering engine 202 also generates the three-dimensional external view 150 of the virtual world (shown in FIG. 2). As described above, the three-dimensional external view 150 emulates a view of the system as would be seen by an operator of the vision inspection system.

The two-dimensional camera image data does not simulate real world camera information. The two-dimensional camera image data has an infinite depth of focus as if it were created using a perfect pinhole camera. This does not accurately simulate the view of real machine vision inspection systems, which often have very small depths of field. Therefore, the vision system hardware components simulation system 140 also includes a lens effects processing engine 204. The lens effect processing engine 204 receives the two-dimensional camera image data including the depth per pixel data from the rendering engine 202. The lens effects processing engine 204 modifies the camera image in accordance with the virtual lens parameters. The lens effects processing engine 204 outputs a two-dimensional image. This two-dimensional image takes into account the virtual optical geometry of the system. One example of a lens effects processing engine is described in *A Lens and Aper-*

*ture Camera Model for Synthetic Image Generation*, Computer Graphics, vol. 15, no. 3, pp. 297–305, August 1981.

It should be understood that the lens effects engine 204 and the rendering engine 202 may form portions of a single processor or may be separate processors. Moreover, the rendering engine 202 and the lens effects engine 204 can be combined into a single rendering and lens effects engine. Such a combined rendering and lens effects engine could be used, for example, with ray tracing rendering to follow each ray through the optical system.

It should be understood that each of the models shown in FIG. 3 can be implemented as portions of a suitably programmed general purpose computer. Alternatively, each of the models shown in FIG. 3 can be implemented as physically distinct hardware circuits within an ASIC, or using FPGA, a PDL, a PLA or a PAL, or using discrete logic elements or discrete circuit elements. The particular form each of the models shown in FIG. 3 will take is a design choice and will be obvious and predicable to those skilled in the art.

Figure 4A:
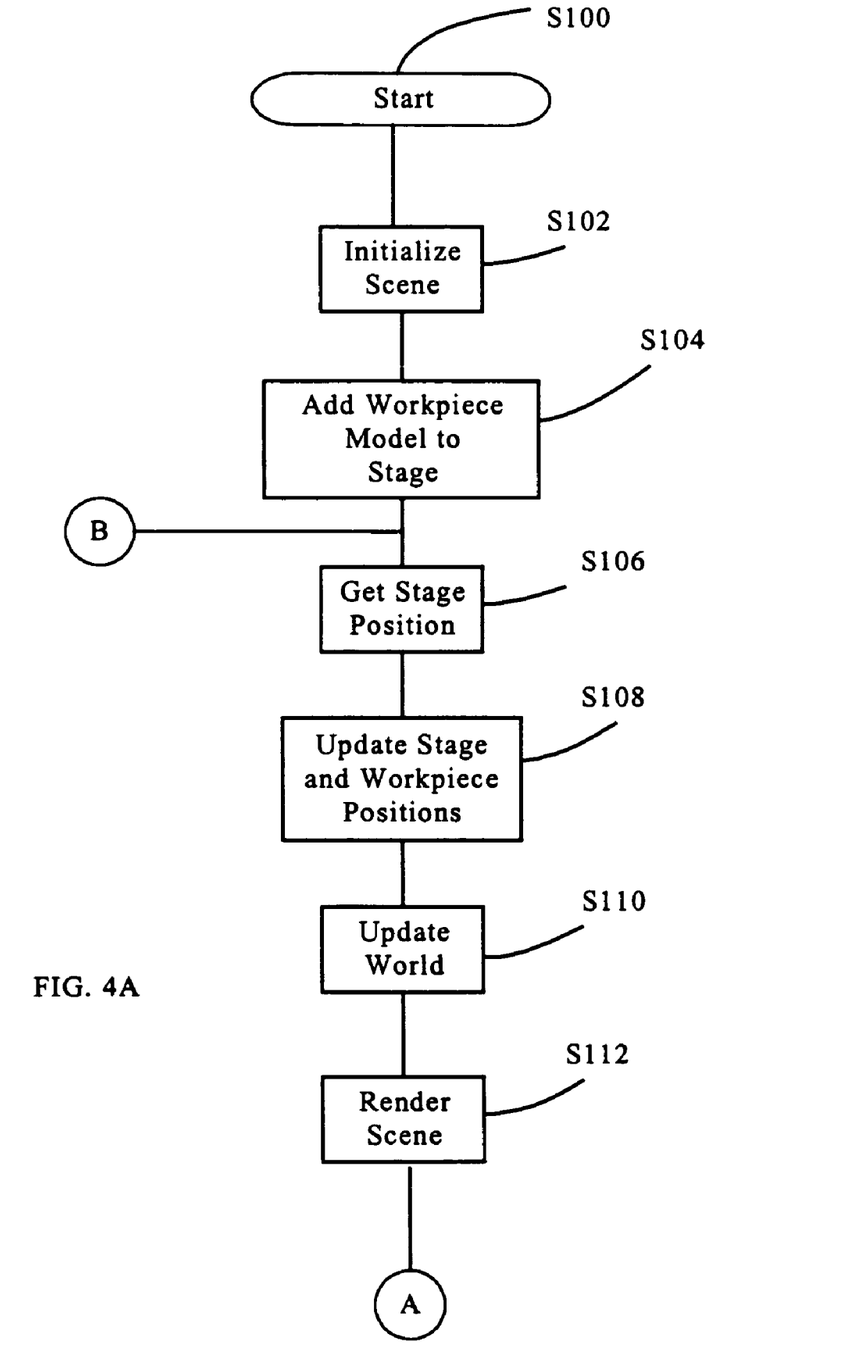
FIGS. 4A and 4B are a flowchart outlining one exemplary embodiment of a method for rendering synthesized images in accordance with this invention.
Figure 4B:
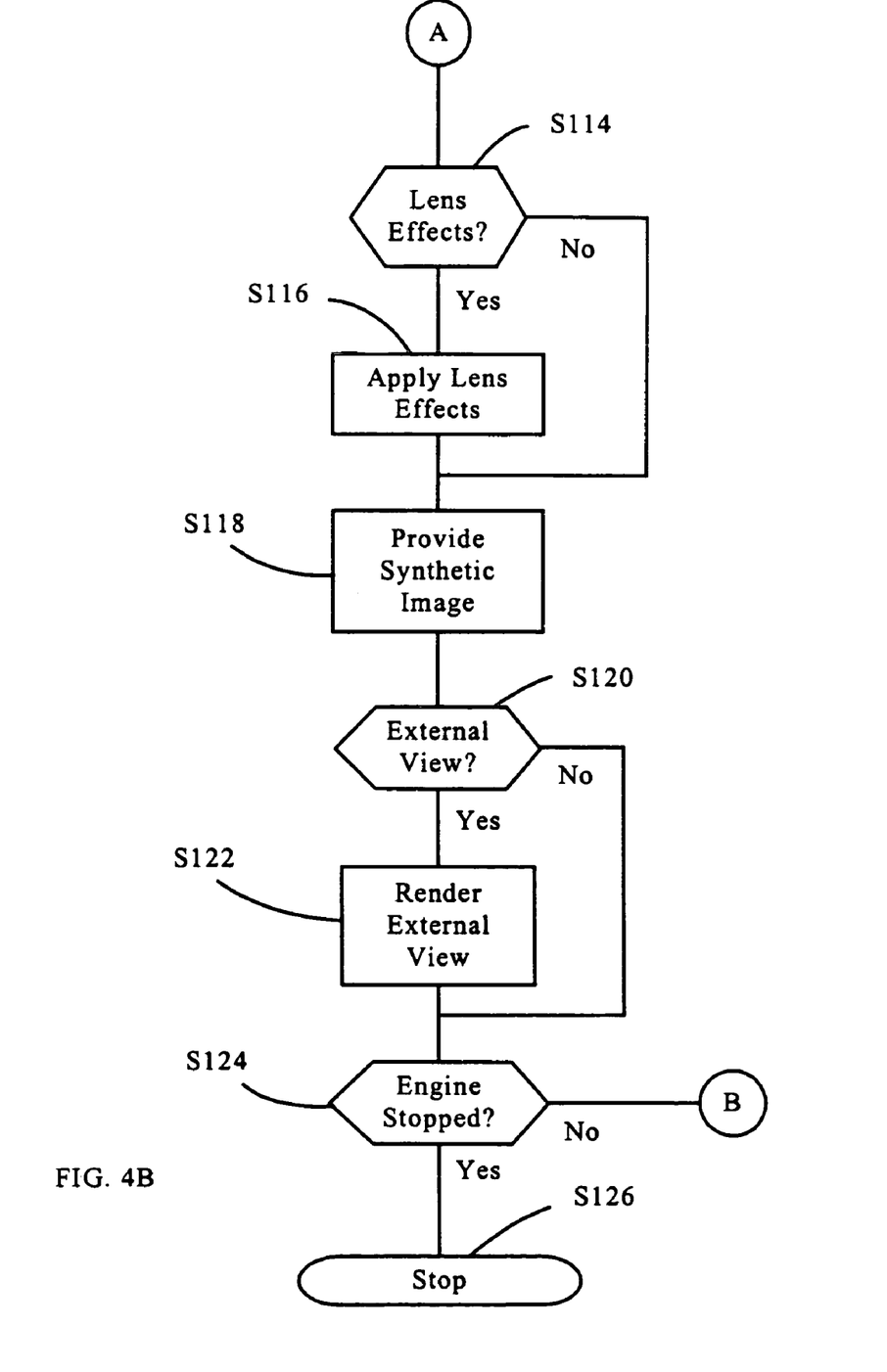

FIGS. 4A and 4B are a flowchart outlining one exemplary embodiment of a method for rendering a vision simulation of a vision inspection system in accordance with this invention. As shown in FIG. 4A, the control routine starts at step S100 and continues to step S102. In step S102, components of the virtual world, such as a table, camera, lighting, etc. are initialized. Then, in step S104, the models of the workpieces are added to the virtual world. Next, in step S106, a stage position is determined. Control then continues to step S108.

In step S108, the positions of the virtual stage and of all workpieces on the virtual stage are updated. Next, in step S110, the virtual world model is updated based on other system parameters, such as lighting, lenses, etc. Then, in step S112, the virtual world is rendered to form a two-dimensional camera image and a corresponding map of pixel depth data. Control then continues to step S114, which is shown in FIG. 4B. Then, in step S114, a determination is made whether lens effects are required. If lens effects are required, control continues to step S116. Alternatively, if lens effects are not required, control jumps directly to step S118. In step S116, virtual lens effects are applied to the simulated image. Next, in step S118, the virtual camera view is provided to a vision inspection control system. Control then continues to step S120.

In step S120, a determination is made whether a virtual external view is required. If a virtual external view is required, control continues to step S122. If a virtual external view is not required, control jumps directly to step S124. In step S122, the virtual external view of the system is rendered. Then, in step S124, a determination is made whether the vision simulation engine should be halted. If the vision simulation engine is to be halted, control continues to step S126. If the vision simulation system is not to be halted, control jumps back to step S106. In step S126, the vision simulation engine is stopped.

It should be appreciated that steps S112–S116 can be combined into a single step that both renders the image and simultaneously adds any lens effects to the image. For example, in a ray tracing system, as each ray is used to render a portion of the image, the path of that ray is followed through the optical system to account for any lens effects.

It should be further appreciated that the flowchart outlined in FIGS. 4A and 4B is one exemplary embodiment of a more-general method for rendering a simulated image from a machine vision system. The machine vision system can be a vision inspection system or a vision system attached to some other machine, such as a robot. This method for rendering the simulated image includes generating a simulated image of a virtual world based upon a first model that characterizes or represents at least one object in the virtual world and a second model that characterizes or represents an optical system, and providing the simulated image to a machine vision control system. The machine vision control system can be an inspection program generation system, such as a system for generating a part program for the vision inspection system described above, or a motion command generation system, such as a system for generating motion commands for a robot having a machine vision system.

Operators are able to modify parameters in the machine vision system and immediately see the results as a change in the synthesized or simulated image. Because the machine vision simulation systems and methods of this invention are usable with existing machine vision system user interfaces, such as vision inspection system user interfaces, a user may gain familiarity with the machine vision user interface prior to interacting with an actual physical vision inspection system.

While this invention has been described with the specific embodiments outlined above, many alternatives, modifications and variations are apparent to those skilled in the art. Accordingly, the preferred embodiments described above are illustrative and not limiting. Various changes may be made without departing from the spirit and scope of the invention.

What is claimed is:

1. An programming system usable to generate instructions for controlling a corresponding machine vision inspection system, the programming system comprising:

a user interface usable for programming of the corresponding machine vision inspection system, comprising:

an image display portion usable to display a synthetic image representative of an image acquired by the corresponding machine vision inspection system, and user-alterable control elements usable to determine instructions usable to control the corresponding machine vision inspection system, the user-alterable control elements comprising at least one control element that affects the focus of the synthetic image representative of an image acquired by the corresponding machine vision inspection system, and an input portion for receiving CAD data representative of at least a portion of at least one object inspectable by the corresponding machine vision inspection system;

a hardware component simulation system, comprising:

a first portion operable to represent at least a current lens system of the corresponding machine vision inspection system, including a limited depth of field of the lens system, and a second portion operable to represent a current state of at least the relative position of the lens system and the portion of at least one object inspectable by the corresponding machine vision inspection system;

a communication interface portion connected to exchange control and data signals between the user interface and the hardware component simulation system; and a portion usable to generate the instructions for controlling the corresponding machine vision inspection system;

wherein the programming system is operable to:

generate a current focus-dependent synthetic image of at least the portion of at least one object inspectable by the corresponding machine vision inspection system, including focus effects related to the limited depth of field of the lens system, based on at least two of a current state of the user-alterable control elements, the current lens system representation of the first portion and the current state representation of the second portion;

display the current focus-dependent synthetic image in the image display portion of the user interface; and generate at least one of the instructions that is usable in an inspection program for controlling the corresponding machine vision inspection system to inspect the at least one object inspectable by the corresponding machine vision inspection system, based at least partially on the current state of the user-alterable control elements.

2. The programming system of claim 1, wherein the at least one instruction that is usable in an inspection program for controlling the corresponding machine vision inspection system to inspect the at least one object includes at least one instruction that determines that a focus-dependent actual inspection image of the at least one object inspectable by the corresponding machine vision inspection system will exhibit respective relatively-more-focused regions of the object corresponding to respective relatively-more-focused regions of the object in the current focus-dependent synthetic image and respective relatively-less-focused regions of the object corresponding to respective relatively-less-focused regions of the object in the current focus-dependent synthetic image.

3. The programming system of claim 1, wherein the at least one control element that affects the focus of the synthetic image appears and operates substantially similarly to a control element included in a user interface of the corresponding machine vision inspection system for affecting the focus of the corresponding machine vision inspection system.

4. The programming system of claim 1, wherein the at least one control element that affects the focus of the synthetic image comprises at least one of a) a focusing control element operable on the synthetic image representative of an image acquired by the corresponding machine vision inspection system and b) a motion control element.

5. The programming system of claim 1, wherein the representation of at least a current lens system of the corresponding machine vision inspection system includes a representation of a plurality of lenses usable as the current lens system of the corresponding machine vision inspection system.

6. The programming system of claim 1, wherein the programming system automatically modifies and displays a modified current focus-dependent synthetic image in response to a modification of at least one of a) the current state of the user-alterable control elements, b) the current lens system representation of the first portion and c) the current state representation of the second portion.

7. The programming system of claim 1, wherein:
the corresponding machine vision inspection system includes a user interface including user-alterable control elements and an image display portion;
the user interface of the programming system is substantially similar to the user interface of the corresponding machine vision inspection system; and
the user-alterable control elements of the programming system comprise a majority of the user-alterable control elements of the corresponding machine vision inspection system, such that the majority of the user-alterable control elements typically appear and operate substantially similarly in both the programming system and the corresponding machine vision inspection system.

8. The programming system of claim 1, wherein:
the hardware component simulation system further comprises a third portion operable to represent a current state of a lighting system of the corresponding machine vision inspection system;
the user-alterable control elements comprise at least one control element that affects the apparent lighting in the synthetic image representative of an image acquired by the corresponding machine vision inspection system; and
the programming system is operable to generate the current focus-dependent synthetic image based on at least three of a current state of the user-alterable control elements, the current lens system representation of the first portion, the current state representation of the second portion and the current state representation of the third portion.

9. The programming system of claim 8, wherein the at least one control element that affects the apparent lighting in the synthetic image comprises a user-alterable control element of the corresponding machine vision inspection system, such that the at least one control element that affects the apparent lighting in the synthetic image appears and operates substantially similarly in both the programming system and the corresponding machine vision inspection system.

10. The programming system of claim 1, wherein:
the user-alterable control elements are operable to determine instructions for controlling the programming system which are substantially similar to instructions determined by the corresponding user-alterable control elements of the corresponding machine vision inspection system for controlling the corresponding machine vision inspection system, when the user-alterable control elements of the respective system are similarly operated;
the hardware component simulation system processes some of the instructions in order to generate the current focus-dependent synthetic image;
the user-alterable control elements include elements operable to determine image inspection instructions substantially similar to at least one image inspection instruction usable in the inspection program for the at least one object inspectable by the corresponding machine vision inspection system; and
the hardware component simulation system generates the current focus-dependent synthetic image in a form which is operable with the image inspection instructions to provide an environment for training a part program based on a focus-dependent synthetic image that is substantially similar to an environment that is provided by the corresponding machine vision inspection system for training a part program based on a focus-dependent actual image.

11. An programming system usable to generate instructions for controlling a corresponding machine vision inspection system, the programming system comprising:
a user interface usable for programming of the corresponding machine vision inspection system, comprising:
an image display portion usable to display a synthetic image representative of an image acquired by the corresponding machine vision inspection system, and
user-alterable control elements usable to determine instructions for controlling the programming system that correspond to the instructions for controlling the corresponding machine vision inspection system, the user-alterable control elements comprising at least a first control element that affects the focus of the synthetic image representative of an image acquired by the corresponding machine vision inspection system and at least a second control element which is operable to determine an image inspection operation to be performed on the synthetic image representative of an image acquired by the corresponding machine vision inspection system, an input portion for receiving CAD data representative of at least a portion of at least one object inspectable by the corresponding machine vision inspection system;

a hardware component simulation system, comprising:
  a first portion operable to represent at least a current lens system of the corresponding machine vision inspection system, including a limited depth of field of the lens system, and
  a second portion operable to represent a current state of at least the relative position of the lens system and the portion of at least one object inspectable by the corresponding machine vision inspection system;

a communication interface portion connected to exchange control and data signals between the user interface and the hardware component simulation system; and a portion usable to generate the instructions for controlling the hardware component simulation system, wherein the programming system is operable to:
  generate a current focus-dependent synthetic image of at least the portion of at least one object inspectable by the corresponding machine vision inspection system including focus effects related to the limited depth of field of the lens system, based on at least two of a current state of the user-alterable control elements, the current lens system representation of the first portion and the current state representation of the second portion;
  display the current focus-dependent synthetic image in the image display portion of the user interface; and
  perform an inspection operation based on the current focus-dependent synthetic image, the image inspection operation determined by operating the second control element.

12. The programming system of claim 11, wherein the programming system is further operable to generate at least one control instruction usable in an inspection program for the at least one object, inspectable by the corresponding machine vision inspection system, based at least partially on the current state of the user-alterable control elements.

13. An machine vision inspection simulation system usable to generate instructions for controlling a corresponding machine vision inspection system that includes a user interface comprising at least an image display portion, user-alterable control elements comprising at least one control element that affects the focus of the synthetic image representative of an image acquired by the corresponding machine vision inspection system and at least one control element which is operable to determine an image inspection operation, the machine vision inspection simulation system comprising:
  a user interface that is usable for programming of the corresponding machine vision inspection system and that is substantially similar to the user interface of the corresponding machine vision inspection system, comprising:
    an image display portion usable to display a synthetic image representative of an image acquired by the corresponding machine vision inspection system; and
    a plurality of user-alterable control elements usable to determine instructions for controlling the programming system that correspond to the instructions for controlling the corresponding machine, the user-alterable control elements comprising at least one control element that affects the focus of the synthetic image representative of an image acquired by the corresponding machine vision inspection system and at least one control element which is operable to perform an inspection operation on the synthetic image representative of an image acquired by the corresponding machine vision inspection system,
    wherein the user-alterable control elements comprise a majority of the user-alterable control elements of the corresponding machine vision inspection system such that the majority of the user-alterable control elements typically appear and operate substantially similarly in both the machine vision inspection simulation system and the corresponding machine vision inspection system;

an input portion for receiving CAD data representative of at least a portion of at least one object inspectable by the corresponding machine vision inspection system;

a hardware component simulation system, comprising:
    a first portion operable to represent at least a current lens system of the corresponding machine vision inspection system, including a limited depth of field of the lens system, and
    a second portion operable to represent a current state of at least the relative position of the lens system and the portion of at least one object inspectable by the corresponding machine vision inspection system; and a communication interface portion connected to exchange control and data signals between the user interface and the hardware component simulation system, wherein the machine vision inspection simulation system is operable to:
    generate a current focus-dependent synthetic image of at least the portion of at least one object inspectable by the corresponding machine vision inspection system including focus effects related to the limited depth of field of the lens system, based on at least two of a current state of the user-alterable control elements, the current lens system representation of the first portion and the current state representation of the second portion;
    display the current focus-dependent synthetic image in the image display portion of the user interface; and
    operate at least one control element which is operable to perform an image inspection operation based on the current focus-dependent synthetic image.

14. The machine vision inspection simulation system of claim 13, wherein the representation of at least a current lens system of the corresponding machine vision inspection system includes a representation of a plurality of lenses usable as the current lens system of the corresponding machine vision inspection system.

15. The machine vision inspection simulation system of claim 13, wherein the machine vision inspection simulation system automatically modifies and displays a modified current focus-dependent synthetic image in response to a modification of at least one of a) the current state of the user-alterable control elements, b) the current lens system representation of the first portion and c) the current state representation of the second portion.

16. The machine vision inspection simulation system of claim 13, wherein:
the hardware component simulation system further comprises a third portion operable to represent a current state of a lighting system of the corresponding machine vision inspection system;
the user-alterable control elements comprise at least one control element that affects the apparent lighting in the synthetic image representative of an image acquired by the corresponding machine vision inspection system; and
the machine vision inspection simulation system is operable to generate the current focus-dependent synthetic image based on at least three of a current state of the user-alterable control elements, the current lens system representation of the first portion, the current state representation of the second portion and the current state representation of the third portion.

17. The machine vision inspection simulation system of claim 16, wherein the representation of a current state of a lighting system of the corresponding machine vision inspection system includes a representation of the current state of a plurality of lights of the corresponding machine vision inspection system.

18. The machine vision inspection simulation system of claim 13 wherein:
the user-alterable control elements are operable to input operation instructions which are substantially similar to the control instructions associated with the operations of corresponding user-alterable control elements of the corresponding machine vision inspection system;
the hardware component simulation system processes the input operation instructions in order to generate the current focus-dependent synthetic image; and
the hardware component simulation system generates the current focus-dependent synthetic image in a form which is operable with the at least one control element which is operable to perform an image inspection operation based on the current focus-dependent synthetic image to provide an environment for training a part program based on a focus-dependent synthetic image that is substantially similar to an environment that is provided by the corresponding machine vision inspection system for training a part program based on a focus-dependent actual image.

19. The machine vision inspection simulation system of claim 13 further comprising a portion usable to generate instructions for controlling the corresponding machine vision inspection system, wherein the machine vision inspection simulation system is further operable to generate at least one instruction usable in an inspection program for controlling the corresponding machine vision inspection system to inspect the at least one object inspectable by the corresponding machine vision inspection system, based at least partially on the current state of the user-alterable control elements.

20. The machine vision inspection simulation system of claim 13, wherein the user interface of the machine vision inspection simulation system further comprises an external view representing the overall configuration of the corresponding machine vision inspection system corresponding to a current operating state of the machine vision inspection simulation system.

21. A method of operating an programming system usable to generate the instructions for controlling a corresponding machine vision inspection system, the programming system comprising:
a user interface usable for programming of the corresponding machine vision inspection system, comprising:
an image display portion usable to display a synthetic image representative of an image acquired by the corresponding machine vision inspection system, and
user-alterable control elements usable to determine instructions usable for controlling the corresponding machine vision inspection system, the user-alterable control elements comprising at least one control element that affects the focus of the synthetic image representative of an image acquired by the corresponding machine vision inspection system;
a hardware component simulation system, comprising:
a first portion operable to represent at least a current lens system of the corresponding machine vision inspection system, including a limited depth of field of the lens system, and
a second portion operable to represent a current state of at least the relative position of the lens system and the portion of at least one object inspectable by the corresponding machine vision inspection system; and
a communication interface portion connected to exchange control and data signals between the user interface and the hardware component simulation system;
the method comprising:
inputting CAD data representative of at least a portion of at least one object inspectable by the corresponding machine vision inspection system;
generating a current focus-dependent synthetic image of at least the portion of at least one object inspectable by the corresponding machine vision inspection system including focus effects related to the limited depth of field of the lens system, based on at least two of a current state of the user-alterable control elements, the current lens system representation of the first portion and the current state representation of the second portion;
displaying the current focus-dependent synthetic image in the image display portion of the user interface; and
generating at least one instruction usable in an inspection program for controlling the corresponding machine vision inspection system to inspect the at least one object inspectable by the corresponding machine vision inspection system, based at least partially on the current state of the user-alterable control elements.

22. The method of claim 21, further comprising altering the at least one control element that affects the focus of the synthetic image to provide a new current state of at least that control element.

23. The method of claim 21, further comprising automatically modifying and displaying a modified current focus-dependent synthetic image in response to a modification of at least one of a) the current state of the user-alterable control elements, b) the current lens system representation of the first portion and c) the current state representation of the second portion.

24. The method of claim 21, further comprising:
operating at least one control element which is operable to perform an image inspection operation based on the current focus-dependent synthetic image.

25. A method of using a machine vision inspection system simulation for a corresponding machine vision inspection system that includes a user interface comprising at least an image display portion, user-alterable control elements comprising at least one control element that affects the focus of the image acquired by the corresponding machine vision inspection system and at least one control element which is operable to determine an image inspection operation, the simulation system comprising:
a user interface that is usable for programming of the corresponding machine vision inspection system and that is substantially similar to the user interface of the corresponding machine vision inspection system, comprising:
an image display portion usable to display a synthetic image representative of an image acquired by the corresponding machine vision inspection system,
a plurality of user-alterable control elements usable to determine instructions for controlling the programming system that correspond to instructions for controlling the corresponding machine, the user-alterable control elements comprising at least one control element that affects the focus of the synthetic image representative of an image acquired by the corresponding machine vision inspection system and at least one control element which is operable to perform an inspection operation,
wherein the user-alterable control elements of the machine vision inspection simulation system comprise a majority of the user-alterable control elements of the corresponding machine vision inspection system such that that majority of the user-alterable control elements and image processing tools typically appear and operate substantially similarly in both the machine vision inspection simulation system and the corresponding machine vision inspection system;
a hardware component simulation system, comprising:
a first portion operable to represent at least a current lens system of the corresponding machine vision inspection system, including a limited depth of field of the lens system, and
a second portion operable to represent a current state of at least the relative position of the lens system and the portion of at least one object inspectable by the corresponding machine vision inspection system; and
a communication interface portion connected to exchange control and data signals between the user interface and the hardware component simulation system;
the method comprising:
inputting CAD data representative of at least a portion of at least one object inspectable by the corresponding machine vision inspection system;
generating a current focus-dependent synthetic image of at least the portion of at least one object inspectable by the corresponding machine vision inspection system including focus effects related to the limited depth of field of the lens system, based on at least two of a current state of the user-alterable control elements, the current lens system representation of the first portion and the current state representation of the second portion;
displaying the current focus-dependent synthetic image in the image display portion of the user interface; and
operating at least one control element which is operable to perform an inspection operation based on the current focus-dependent synthetic image.

26. The method of claim 25, further comprising automatically modifying and displaying a modified current focus-dependent synthetic image in response to a modification of at least one of a) the current state of the user-alterable control elements, b) the current lens system representation of the first portion and c) the current state representation of the second portion.

27. The method of claim 25, wherein the hardware component simulation system further comprises a third portion operable to represent a current state of a lighting system of the corresponding machine vision inspection system and the user-alterable control elements comprise at least one control element that affects the apparent lighting in the synthetic image representative of an image acquired by the corresponding machine vision inspection system, and wherein generating the current focus-dependent synthetic image further comprises basing the current focus-dependent synthetic image on the current state representation of the third portion.

28. The method of claim 25, further comprising generating at least one control instruction usable in an inspection program for the at least one object inspectable by the corresponding machine vision inspection system, based at least partially on the current state of the user-alterable control elements.

29. An programming system comprising:
a first portion of a machine vision inspection system;
a hardware component simulation system that simulates a second portion of the machine vision system, the hardware component simulation system including:
a first part that represents a lens system including a limited depth of field of the second portion of the machine vision inspection system, and
a second part that represents a current state of the relative position of the lens system and a portion of an object to be inspected by the first portion of the machine vision inspection system;
a communication interface between the first portion of the machine vision system and the hardware component simulation system, wherein the programming system generates instructions for controlling the machine vision inspection system.

* * * * *